(12) United States Patent
Russell et al.

(10) Patent No.: US 6,985,661 B1
(45) Date of Patent: Jan. 10, 2006

(54) PHOTONIC CRYSTAL FIBRE AND A METHOD FOR ITS PRODUCTION

(75) Inventors: Philip S Russell, Bath (GB); Timothy A Birks, Bath (GB); Jonathan C Knight, Bath (GB); Brian J Mangan, Bath (GB)

(73) Assignee: NKT Research & Innovation A/S, Birkerod (DK)

( * ) Notice: Subject to any disclaimer, the term of this patent is extended or adjusted under 35 U.S.C. 154(b) by 0 days.

(21) Appl. No.: 09/937,715

(22) PCT Filed: Mar. 31, 2000

(86) PCT No.: PCT/GB00/01249

§ 371 (c)(1),
(2), (4) Date: Jan. 16, 2002

(87) PCT Pub. No.: WO00/60388

PCT Pub. Date: Oct. 12, 2000

(30) Foreign Application Priority Data

Apr. 1, 1999 (GB) .................................. 9907655

(51) Int. Cl.
*G02B 6/02* (2006.01)

(52) U.S. Cl. ....................................... 385/125; 385/123

(58) Field of Classification Search ........ 385/123–128; 65/393, 403, 408, 411, 435, 439, 376, 385
See application file for complete search history.

(56) References Cited

U.S. PATENT DOCUMENTS 5,629,534 A * 5/1997 Inuzuka et al. ............... 257/84
5,802,236 A 9/1998 DiGiovanni et al. ........ 385/127

6,301,420 B1 * 10/2001 Greenaway et al. ........ 385/126

(Continued)

FOREIGN PATENT DOCUMENTS

EP 0 783 7843 7/1997

(Continued)

OTHER PUBLICATIONS

Barkou et al, "Silica-air photonic crystal fiber design that permits waveguiding by a true photonic bandgap effect", Optics Letters 24(1):46-48 (Jan. 1999).

(Continued)

*Primary Examiner*—Sarah Song (74) *Attorney, Agent, or Firm*—Buchanan Ingersoll PC (57) ABSTRACT

This invention relates to an optical fibre that comprises a core (4) of lower refractive index that is surrounded by a cladding which includes regions of a higher refractive index and is substantially periodic, where the core (4) has a longest transverse dimension that is longer than a single, shortest period of the cladding. In a fibre of this type light is substantially confined to the core area by virtue of the photonic band gap of the cladding material. The invention also relates to a method of manufacturing such an optical fibre, comprising the steps of forming a stack of canes (5), the stack (5) including at least one truncated cane (6) that defines an aperture (7), and then drawing the stack (5) into a fibre having an elongate cavity. The fibre is suitable for high power uses, but is equally suitable for other areas, e.g. optical amplifiers, spectral filters, lasers, gas sensors and telecommunications networks.

43 Claims, 4 Drawing Sheets

U.S. PATENT DOCUMENTS

| | | |
|---|---|---|
| 6,404,966 B1 | 6/2002 | Kawanishi et al. |
| 6,463,200 B2 * | 10/2002 | Fink et al. .................. 385/123 |
| 6,496,632 B2 * | 12/2002 | Borrelli et al. ............. 385/123 |
| 6,598,428 B1 * | 7/2003 | Cryan et al. .................. 65/409 |
| 6,606,440 B2 * | 8/2003 | Hasegawa et al. .......... 385/125 |
| 6,845,204 B1 * | 1/2005 | Broeng et al. .............. 385/126 |

FOREIGN PATENT DOCUMENTS

| | | |
|---|---|---|
| WO | WO 9900685 A1 * | 1/1999 |
| WO | WO 99/64903 | 12/1999 |
| WO | WO 00/06506 | 2/2000 |

OTHER PUBLICATIONS

Broeng et al, "Highly increased photonic band gaps in silica/air structures", Optics Communications 156(4-6):240-244 (Nov. 1998).

Lin et al, "High-Q Photonic Bandgap Resonant Cavities: from mm-wave to Optical Regime", Proceedings of the SPIE 2693:170-175 (1996).

J.C. Knight et al., "Photonic Crystals as Optical Fibres-Physics and Applications" Optical Materials vol. 11, 1999, pp. 143-151.

* cited by examiner

PHOTONIC CRYSTAL FIBRE AND A METHOD FOR ITS PRODUCTION

BACKGROUND OF THE INVENTION

1. Field of the Invention

This invention relates to a photonic crystal fibre, to a method of making a photonic crystal fibre and to a method of transmitting light along a photonic crystal fibre.

2. Discussion of Prior Art

Optical fibres are used for transmitting light from one place to another. Normally, optical fibres are made of more than one material. A first material is used to form a central light-carrying part of the fibre known as the core, while a second material surrounds the first material and forms a part of the fibre known as the cladding. Light can become trapped within the core by total internal reflection at the core/cladding interface. Total internal reflection in general causes no losses other than the intrinsic absorptive and scattering losses associated with the materials themselves. Conventional and commercial low-loss optical fibres typically have a total internal reflection structure; however, one limitation of the waveguiding mechanism (which we refer to as "index guiding") is that the refractive index of the material forming the core must be higher than that of the material forming the cladding, in order to achieve total internal reflection. Even if the cladding is air (with a refractive index of approximately unity) the core material must still be a solid material for the fibre to be useful. In practice, using air as the cladding material is normally not advisable, because it does not offer sufficient mechanical or optical protection of the waveguiding core. Thus, conventional optical fibres consist of a solid or liquid core material surrounded by a solid cladding.

An optical fibre waveguide having a significantly different structure from that of conventional optical fibres has been demonstrated, in which a single microstructured material is used to form the fibre core and cladding. The introduction of morphological microstructure into the fibre—typically in the form of an array of small holes which run down the length of the fibre—alters the local optical properties of the fibre, making it possible to design and fabricate intricate waveguiding structures with most unusual properties. Such a fibre is an example of a photonic crystal fibre.

In one type of photonic crystal fibre, a fibre with a periodic array of air holes in its cross-section and with a single missing air hole in the centre (a "defect" in the crystal structure) forms a low-loss all-silica optical waveguide which remains monomode for all wavelengths within the transmission window of the silica. The waveguiding mechanism in that case is closely related to that in conventional optical fibres and is a form of total internal reflection from a material which has a lower apparent refractive index than that of pure silica.

Another type of waveguiding has also been demonstrated in a photonic crystal fibre with a periodic array of air holes. Light can become trapped in the vicinity of an extra air hole within the photonic crystal lattice (i.e. a "low-index" lattice defect), if the photonic crystal is appropriately designed to exhibit a "photonic band gap". A photonic band gap is a range of parameters—for example, a range of frequencies or wavevectors—for which light would normally be expected to propagate in the cladding material but where there are no propagating modes due to the detail of the microstructuring. In fibres of that type that have been demonstrated to date (see, for example, J. C. Knight, J. Broeng, T. A. Birks and P. St. J. Russell, "Photonic Band Gap Guidance in Optical Fibres", Science 282 1476 (1998)), light, propagating along a fibre, is trapped in the vicinity of a low-index defect within a fibre with a honeycomb array of air holes, but nonetheless is strongly confined to the high-index phase of the microstructured material. The light is evanescent in the air, so the observed guided mode is concentrated in the silica surrounding the extra air hole at the core.

Guidance of light through hollow fibres in the form of glass capillaries has been demonstrated, but such devices are inherently very leaky.

SUMMARY OF THE INVENTION

A long-term goal of our research has been the creation of a band-gap guiding fibre in which light is trapped within an air hole, or some other region of lower refractive index and is guided, without significant leakage, in that region of lower refractive index. Losses resulting from the fibre cladding material could be largely avoided in such an arrangement. That goal has not, however, until now proved attainable.

According to the invention, there is provided a photonic crystal fibre comprising a region of substantially uniform, lower refractive index which is substantially surrounded by cladding which includes regions of higher refractive index and which is substantially periodic, characterised in that the region of lower refractive index has a longest transverse dimension which is longer than a single, shortest, period of the cladding, whereby light can be substantially confined in the lower index region by virtue of a photonic band gap of the cladding material and can be guided along the fibre whilst it is so confined.

We have found that use of a region of lower refractive index which is relatively large enables guidance to be achieved in the region of lower refractive index and we have made a fibre in which light is guided, substantially without leakage, in a hollow core. It will be understood that the region of "lower" refractive index has a refractive index which is smaller in magnitude than the refractive index of the region of higher refractive index.

Such a fibre has advantages over other optical fibres; for example, performance may be much less limited by interaction (absorptive or non-linear) between the propagating light and material comprising the fibre. Some light may penetrate the higher-index material to a significant extent, but most light is confined to the region of lower refractive index, which might be, for example, an air hole. Fibres according to the invention could be useful in, for example, telecommunications, environmental sensing and monitoring, high power laser transmission, long wavelength transmission and in other optical devices.

The power-handling capacity of a fibre is limited by non-linear processes in the materials from which they are made. In a fibre where the light is concentrated in air, and only a small proportion of its power is in glass, the power carrying capacity is much greater than in conventional fibres.

Ultra-high power single-mode transmission, possibly even of light which is strongly absorbed by silica glass such as that from a $CO_2$ laser, is a possible application of such a fibre. High power laser light delivery is another application, which also makes use of the ability of the fibre to transmit much higher power than a conventional fibre; delivery of 100 W to 1 kW to a machining head, from a large-frame laser, is, for example, a recurrent need. High power lasers represent an area with broad applications in, for example, high speed printing, laser machining of materials, and possibly surgery; fibre lasers are efficient, offering a high power per kg. Their compactness, and the high quality of the beams they produce, make them very attractive in all kinds of portable laser apparatus.

Another application of the fibre of the invention is in telecommunications. The ability of the fibre to carry high powers would allow more light to be launched into one section of a communications link. The link could therefore be longer without optical attenuation making the signal undetectably small. Such a fibre with gain (by erbium doping) could be used as a high power amplifier to act as a repeater for a chain of such links.

Another application might be atom guiding, in which individual atoms are transported along the hollow core, without hitting the walls, by being "carried along" a powerful light beam.

Ultra-long path lengths of light through gases, with a single transverse mode, present significant opportunities for high resolution spectroscopy and sensing applications.

Fresnel reflections, which are a problem in fibre devices where light is extracted from a fibre and then reinjected after modulation or amplification, can be very small in the fibre, because the refractive index discontinuity between the outside world and the fibre mode can be tiny. This suggests that bulk optical devices having near-zero insertion loss could be implemented for the first time. In contrast, the index step between a conventional fibre and air always causes some light to be reflected at a fibre end face. Not only does this cause loss of light, but unwanted reflections can seriously destabilise any laser sources that they re-enter, and cause optical amplifiers to oscillate as lasers (a highly undesirable event).

Guidance in a lower-index region is possible because the photonic band gap material of the fibre cladding can behave in a manner similar in some respects to a totally reflecting, perfect metal under some circumstances but, unlike real metals, such a quasi-metal exhibits very low losses at optical frequencies. The photonic band gap material behaves like a metal when it exhibits a full two-dimensional photonic band gap; that is, when light propagating with a particular wavevector component along the fibre and at a particular frequency sees, at all azimuthal angles, material having a band gap. Only certain wavelength bands are confined and guided down the fibre, those bands corresponding to the presence of full two-dimensional band gaps in the photonic crystal cladding.

The wavevector component along the waveguide, known as the propagation constant $\beta$, determines whether light is propagating or evanescent in any part of the guide. If $\beta<kn$, the light propagates at an angle $\theta$ to the axis in a material of refractive index n, where $\beta = kn \cos \theta$ and k is the vacuum wave constant. If $\beta>kn$, $\theta$ is imaginary and the light is evanescent. Conventional total internal reflection, with a core of index $n_1$ greater than the cladding index $n_2$ ensures the existence of a range of $\beta$ where light is propagating in the core while being evanescent in the cladding.

In contrast, light can be confined between two multilayer dielectric stacks in a core of arbitrary refractive index, if the stacks have a photonic band gap for a range of $\beta$ at a given optical frequency. We identified two distinct regimes of photonic band gap guidance. In the first, light propagates ($\beta<kn_1$) in the layers of high index $n_1$ but is evanescent ($\beta>kn_2$) in the layers of low index $n_2$. The high index layers act as individual total internal reflection waveguides, supporting bound modes at specific values of $\beta=\beta_m$. Resonant tunneling between adjacent high-index layers permits leakage of light through them, provided $\beta$ lies within the pass bands that open up around each $\beta_m$. The widths of the pass bands depends on the strength of coupling between the layers. Between the pass bands lie band gaps; if a high-index core layer with a different (maybe smaller) width supports a mode with $\beta$ inside a band gap, it is not resonant with the other layers and light leakage by tunneling is frustrated. The mode is thus strictly guided by the frustrated tunneling form of photonic band gap guidance.

In the second regime of photonic band gap guidance, light can propagate in all layers ($\beta<kn_2$). Band gaps occur at the Bragg condition as a result of multiple scattering and interference, leading to the Bragg form of photonic band gap guidance.

In both forms of photonic band gap guidance, the refractive index of the core can be chosen much more freely than in total internal reflection guidance, because the photonic band gap conditions depend only on the properties of the cladding stacks. Guided modes can exist with mode indices $\beta/k$ that are lower than the "mean" index of the stacks (the frustrated tunneling guidance case) or even lower than the lowest index of the stacks (the Bragg guidance case), conferring extra design freedom over total internal reflection guidance, and allowing confinement within a hollow core.

The substantially periodic cladding may have a triangular lattice structure. The triangular lattice may comprise air holes in a solid matrix.

Preferably, the regions of higher refractive index consist essentially of silica. Materials other than silica may also be used, including other silicate glasses and soft glasses of different compositions. The fraction of air in this part of the fibre needs to be relatively large to exhibit a sufficiently broad band gap. Advantageously, the fraction of air in the cladding is at least 15%, and may be more than 30%, by volume based on the volume of the cladding.

Whilst it is within the scope of the invention to provide a region of lower refractive index that is of elongate cross-sectional shape, it will generally be preferred for the region to be of generally round cross-section.

It should be understood that the fibre may include more than one region of lower refractive index.

Preferably the region of lower refractive index comprises a gas or a vacuum; the region of lower refractive index may be at atmospheric pressure (or even a higher pressure) but it may also be a low pressure region. The gas is preferably air. The substantial confinement of light to the region of lower refractive index means that the photonic crystal fibre may be capable of transmitting light at powers, and/or at wavelengths, at which it is not possible to transmit light in conventional fibres.

In an example of the invention described below the region of lower refractive index is of substantially round cross-section and has a diameter that is about 2½ times the shortest period of the cladding. Larger or smaller diameters may, however, be used. Preferably the region of lower refractive index has a longest transverse dimension at least 1.5 times longer, and preferably at least 2 times longer, than a single, shortest period of the cladding.

The actual cross-sectional dimensions of the region of lower refractive index will depend upon the wavelength(s) of light to be guided along the fibre, the period of the cladding and, in some cases, the refractive index of the region of lower refractive index. In an example of the invention described below the region of lower refractive index is of generally round cross-section and has a diameter of about 15 $\mu$m. Usually it will be preferred that the region of lower refractive index has a longest transverse dimension of at least 9 $\mu$m, and preferably at least 12 $\mu$m.

A strong interaction may be possible between light in the guided mode and the fluid which may form the lower index waveguiding core; that interaction could be useful, for example, for gas sensing and monitoring. The lower index region may comprise a material having a non-linear optical response, whereby light may be generated or modulated by non-linear processes in the lower index region.

Optical properties of the fibre can be accurately computed once the fibre size is fixed. The photonic band gap of the periodic fibre cladding can extend over a broad range of frequencies; however, in general, the mode will be guided in the lower-index region only over a relatively narrow range of frequencies. The narrowband performance of the fibre suggests that it should be useful as a spectral filtering device.

A photonic crystal fibre according to the invention may alternatively be defined in terms of the region of lower refractive index being large enough to support at least one guided transverse mode. Thus according to the invention there is provided a photonic crystal fibre comprising a region of substantially uniform, lower refractive index which is substantially surrounded by cladding which includes regions of higher refractive index and which is substantially periodic, characterised in that the region of lower refractive index is large enough to support at least one guided transverse mode.

Preferably, the photonic crystal fibre is a single-mode fibre.

A wide variety of optical devices incorporating a photonic crystal fibre according to the invention can be envisaged. As has been described, such a device could, for example, comprise a sensor that is capable of sensing a property of the gas of which the region of lower refractive index is comprised or it could comprise a spectral filtering device. Other optical devices which could include such a fibre include, for example, an optical amplifier or a laser.

Optical fibres are widely used in the telecommunications industry. A telecommunications system could include an optical fibre according to the invention and such a telecommunications system could be included in a telecommunications network.

Also according to the invention, there is provided a method of making an optical fibre, comprising the following steps:

(a) forming a stack of canes, the stack including at least one truncated cane which defines a cavity in the stack;

(b) drawing the stack into a fibre having an elongate cavity.

Such an approach represents a modification of a fabrication process previously disclosed for photonic crystal fibres; in the known process there are no truncated canes in the stack. However, if canes are removed from the middle of such a stack and, especially if two or more canes that are adjacent to one another are removed, the resulting preform may no longer be stable and self-supporting. Even removing one cane may, however, give rise to a problem. In the method according to the invention, lengths of cane, or bundles of canes, that have the shape and size required for the final hole are embedded within the stack of canes at the opposite ends of the stack. The lengths of those embedded canes are such that they do not meet in the middle of the stack. Instead, a length (which may be approximately 15 cm) intermediate the ends of the preform is left with the required large air hole, supported from either end in a stable fashion. After the (complete) preform is drawn down into a fibre (in one or more stages), only the fibre from the central part of the preform is retained.

The method according to the invention could be useful for constructing a wide variety of fibre structures, which would otherwise be difficult to manufacture. Thus the method is not restricted only to a method of making a photonic crystal fibre according to the invention.

It should be understood that the method may involve forming a stack of canes that defines more than one cavity in the stack. In that way a fibre with more than one elongate cavity may be formed.

Preferably, the cavity has a transverse dimension greater than the corresponding transverse dimension of any of the canes. The cavity may have a transverse dimension greater than the sum of the corresponding dimensions of any two of the canes.

Preferably, the stack of canes comprises canes which are capillaries, which may form a triangular array. The capillaries may be filled with air or with a material other than air; they may be partially or completely evacuated. The cavity may have a cross-sectional area substantially equal to or greater than the cross-sectional area of a bundle of four, and more preferably a bundle of seven, of the canes.

Also according to the invention there is provided a method of transmitting light along a photonic crystal fibre, the fibre being a fibre as defined above.

BRIEF DESCRIPTION OF THE DRAWINGS

By way of example, an embodiment of the invention will now be described, with reference to the accompanying drawings, of which.

DETAILED DISCUSSION OF EMBODIMENTS

Figure 1:
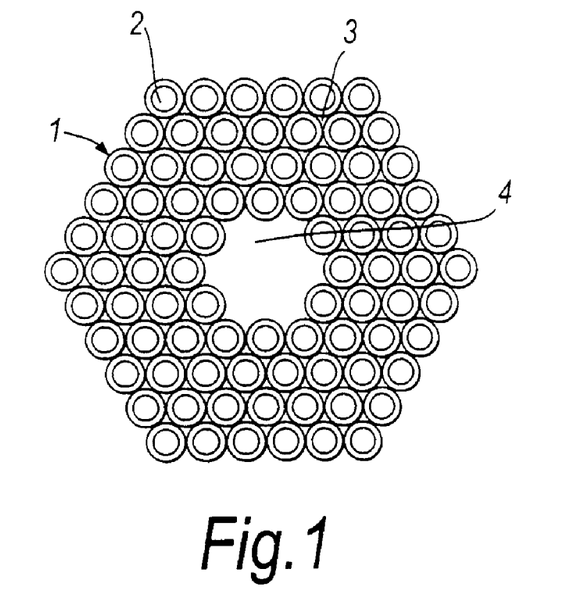
FIG. 1 is a schematic cross-section of an optical fibre.

Light can be guided in an "air-mode" in a hole in a fibre waveguide such as that shown in FIG. 1. The fibre comprises a cladding formed by a triangular array of fused, elongate tubes 1, which have been drawn from silica capillaries and contain longitudinal air holes 2. The capillaries are of circular cross-section resulting in interstitial holes 3 between the tubes 1. The fibre also comprises a core in the form of a large air hole 4 at its centre. The air hole 4 is formed in this example, as described below, by omitting a bundle of seven capillaries from part of the fibre's preform and is therefore the size of seven unit cells of the cladding material; the hole 4 is therefore much larger than the holes 2 in the fused tubes 1 and also very much larger than the interstitial holes 3. Fibres formed by omitting just a single cane were observed not to guide modes in the air hole.

It is useful to consider why it is that photonic crystal fibres with similar cladding parameters but with a defect formed by omitting just a single capillary have not been found to support guided modes. The number of guided modes that a conventional fibre can support is determined by the core-cladding index difference and the size of the core. This follows fundamentally from phase-space arguments closely analogous to well-known density-of-states calculations in solid-state physics, and leads to the result that the approximate number of spatial modes in a convention fibre is:

$$N_{conv} = \frac{r_{co}^2 k^2 (n_1^2 - n_2^2)}{4} \quad (1)$$

where $r_{co}$ is the core radius, $n_1$ and $n_2$ the core and cladding refractive indices, and k the vacuum wavevector. (There are of course two polarization states per spatial mode.) In a hollow-core photonic crystal fibre, a similar expression may be derived for the approximate number of spatial modes present in the hollow core:

$$N_{PBG} = \frac{r_{co}^2 (\beta_H^2 - \beta_L^2)}{4} \text{ or } \frac{r_{co}^2 (k^2 n_1^2 - \beta_L^2)}{4} \quad (2)$$

where $\beta_H$ and $\beta_L$ are the upper and lower edges of the photonic band gap at fixed optical wavelength, and the second expression applies if the upper photonic band gap edge extends beyond the maximum core wavevector, i.e., if $k^2 n_1^2 < \beta_H^2$. Theory shows that, for a typical triangular array of air holes in silica, the photonic band gap width $\Delta\beta = \beta_H - \beta_L$ is a small fraction of its average position $\beta_{av} = (\beta_H + \beta_L)/2$. For example, at $\beta_{av}\Lambda = 9$, $\Delta\beta\Lambda = 0.2$ and taking $r_{co} = \Lambda/2$ for a single missing stack cane ($\Lambda$ is the inter-hole spacing) the expected number of spatial modes is 0.23, making it unlikely that any air-guided mode will be seen. On the other hand, if seven stack canes are removed, the hollow core area is increased by a factor of 7, the core radius by a factor of $\sqrt{7}$ and the expected number of spatial modes becomes 1.61. This suggests that a seven-cane hollow core will support at least a single transverse mode (two polarization states) and perhaps a second transverse mode. These predictions are consistent with our observations that fibres made with a single-cane air hole do not support air-guided modes, whereas those with a seven-cane hole guide light in one or two modes.

The pitch, lattice, and filling fraction of the cladding region are chosen so as to exhibit a 2-dimensional photonic band gap (see, for example, T. A. Birks, P. J. Roberts, P. St. J. Russell, D. M. Atkin and T. J Shepherd, "Full 2-d photonic bandgaps in silica/air structures", Electron. Lett. 31 1941 (1995)). Light within the hole 4 is trapped by the photonic band gap of the surrounding material. Consequently, the light cannot propagate away from the fibre core but is constrained to travel along the fibre axis, substantially confined to the core, as a guided mode.

In the fabrication process previously disclosed for photonic crystal fibres, several hundreds of canes, at least some of which may be capillary tubes, are stacked together to form the required crystal structure on a macroscopic scale. Those canes typically have an external diameter of the order of a millimeter. The entire stack is then held together while being fused and drawn down into fibre using an optical fibre drawing tower. That standard procedure will not result in a preform which is stable or self-supporting if it has the required large air hole in the middle.

Figure 2:
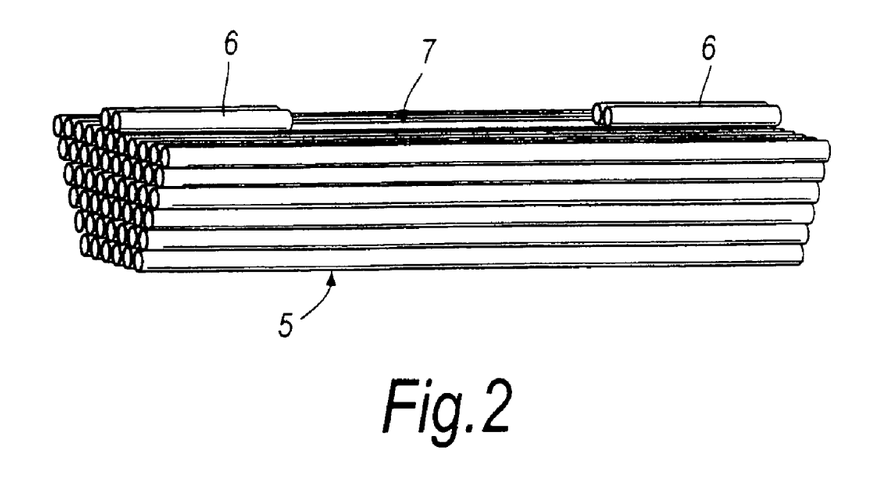
FIG. 2 shows part of a preform suitable for making the optical fibre of FIG. 1.

The preform shown in part in FIG. 2 provides a solution to that difficulty. Two truncated lengths 6 of stacked canes, are embedded within the stack of canes 5. The truncated canes 6 are present at both ends of the preform but they do not meet in the middle of the stack. Instead, they define a short cavity 7. The innermost canes 5, which would otherwise collapse into the cavity, are thus supported from both ends in a stable fashion. A transverse cross-section through the full preform, and through the cavity 7, thus has a form similar in shape to the schematic in FIG. 1. The preform is drawn down into fibre (in one or more stages) in the usual manner. Once the fibre has been drawn, only that fibre from the central part of the preform is retained.

Figure 3:
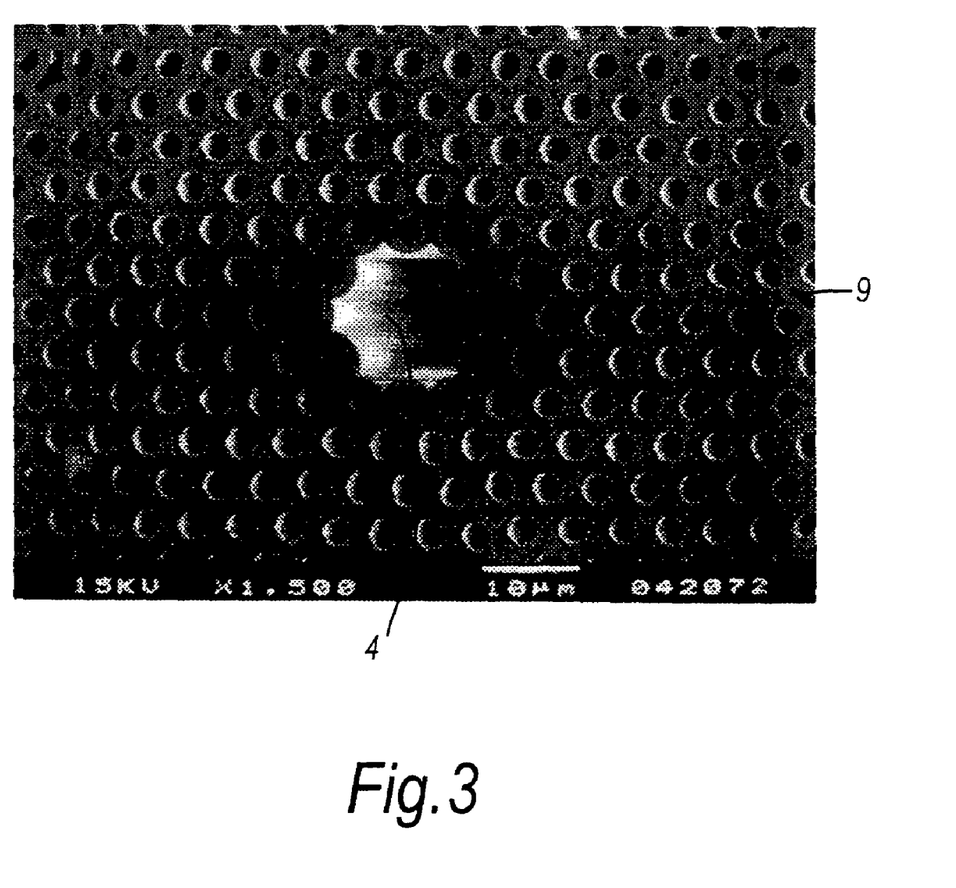
FIG. 3 is a scanning electron microscope photograph of an actual fibre of the kind illustrated schematically in FIG. 1.

The fibre of FIG. 3 was fabricated using this technique. It can be seen that the structural integrity of hole 4 has been maintained in the drawing process. In general, the high quality of the lattice of the fibre of FIG. 3 is striking and the fibre cross-section closely resembles the schematic of FIG. 1. Some defects 9 can be seen, but their influence is not sufficiently deleterious to prevent air-mode guidance in the fibre.

In a particular example of the invention, the fibre is formed from 331 silica capillaries each of circular cross-section and having an external diameter of 0.8 mm and an internal diameter of about 0.7 mm. The capillaries were arranged as described with reference to FIG. 2 with seven capillaries in the centre of the array being omitted over a middle part of their lengths so as to define a cavity of length 15 cm. The preform was drawn into a fibre as described above; the resulting fibre had an external diameter of 90 µm and a central hole 4 of diameter 15 µm.

Initial characterisation was carried out by holding ~3 cm long samples vertically, illuminating them from below with white light (using a Tungsten halogen lamp), and observing the light transmitted through them in an optical microscope. The central air core was filled with a single lobe of coloured light, its transverse profile being smooth, peaked in the centre and falling off to very low intensities at the glass-air boundary. A significant amount of white light was present in the periodic cladding, and it was striking how colourless it appeared in comparison to the mode trapped in the core. Different colours of vacuum-guided mode were seen, depending on the overall fibre size and the drawing conditions used. The precise colour was sometimes hard to assign by eye, and in fact in some cases appeared to be a mixture of different colours, e.g., red and blue. For appropriate excitation with the white light source, a few samples supported a similarly coloured two-lobed mode, which we attribute to a second guided mode falling in the same band gap as the first.

The transmission spectra through the air core of lengths of fibre were measured by linking the microscope via a conventional multimode fibre to an optical spectrum analyser. The spectral dependence of the waveguiding in the air hole demonstrated that several well-defined bands of transmission were present, covering the whole visible spectrum and extending into the infrared. Each of those bands corresponded to a full 2-D photonic band gap, and is related to higher order Bragg conditions in the photonic crystal cladding. Since the pitch of the crystal was large in comparison to the wavelength, the photonic band gaps responsible for the guidance were of high order. By selecting lengths of fibre which had been shown to support a guided mode at appropriate wavelengths, we excited this mode using laser sources. Within each transmission band, losses were small or zero over fibre lengths of several centimeters, whereas between those bands the losses were much larger, as expected in the absence of photonic band gap effects. The length was limited by fluctuations in the fibre parameters, which caused the wavelengths of the guided modes to vary along the length of fibre. In other fibres, which do not support guided modes at that wavelength, the laser light leaked entirely into the cladding after propagating only a fraction of a centimeter.

Laser light guided in the air formed a stable, smoothly varying single lobed pattern in the far field. By incorporating a guiding length of fibre into one arm of a Mach-Zehnder interferometer, we confirmed that the laser light transmitted through the guiding core had a high degree of spatial coherence, giving high visibility fringes at the interferometer output. That would not be the case if there were many waveguide modes excited in the fibre core.

Figure 4:
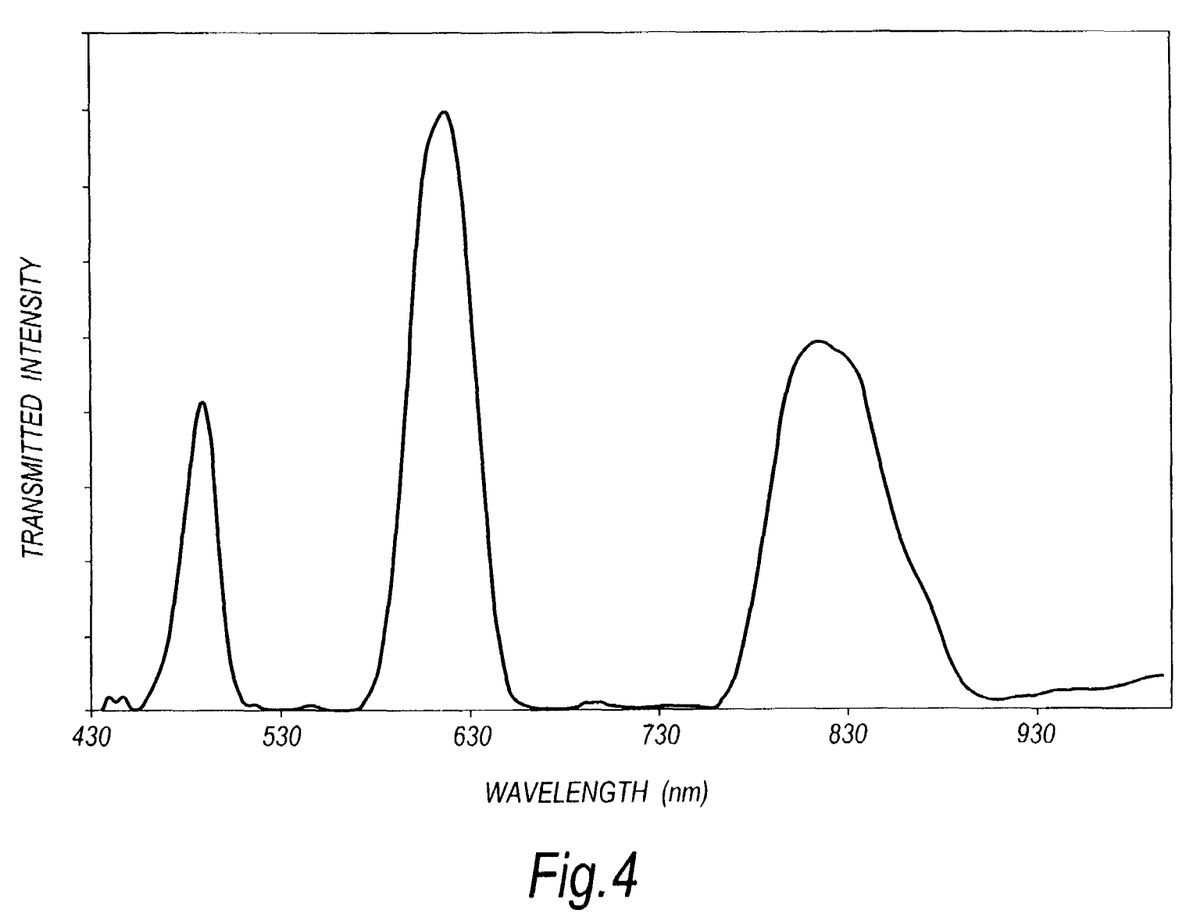
FIG. 4 shows an emission spectrum recorded from a fibre such as that shown in FIG. 3.
Figure 5:
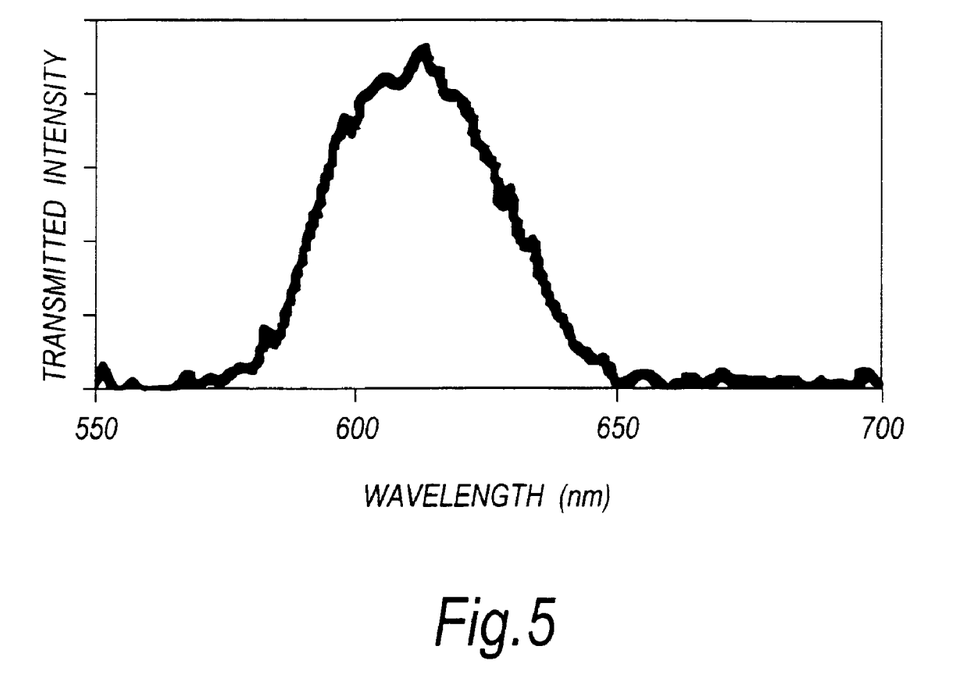
FIG. 5 shows another emission spectrum recorded from a fibre such as that shown in FIG. 3, the spectrum in this instance being recorded only for the red spectral region.

The optical transmission spectra of the fibre were examined and are shown in FIGS. 4 and 5 in each of which transmitted intensity is plotted against wavelength. The optical transmission spectra shown in FIGS. 4 and 5, demonstrate that the fibre supports air-modes at a number of wavelengths; there are strong transmission peaks around 490 nm, 610 nm and 810 nm. There also appears to be, in FIG. 4, evidence of ultra-violet transmission at around 440 nm. It may be noted that the transmission pass-bands are narrow compared with those of conventional optical fibres.

In the example of the invention described with reference to the drawings the region of lower refractive index is air and the fibre is made by forming a stack of canes which includes truncated canes to define a cavity in the stack. It is within the scope of the invention for the cavity in the stack to be filled partly or completely with a material other than air and/or with one or more canes of lower refractive index than the canes used to form the cladding.

Where reference is made in this specification to "light" it should be understood that the term "light" includes electromagnetic radiation at frequencies outside the visible spectrum.

What is claimed is:

1. A photonic crystal fibre comprising:
    a region of substantially uniform, lower refractive index;
    said lower refractive index region substantially surrounded by cladding which includes non-coaxial regions of higher refractive index and which is substantially periodic, wherein the regions of higher refractive index are made of canes, and wherein the region of lower refractive index has a longest transverse dimension which is longer than a single, shortest period of the cladding, whereby wherein the region of lower refractive index has a longest transverse dimension which is sufficiently large to provide that light is substantially confined in the lower refractive index region by virtue of a photonic band gap of the cladding material and is guided along the fibre.

2. A photonic crystal fibre, as claimed in claim 1, in which the region of lower refractive index comprises a gas or a vacuum.

3. A photonic crystal fibre, as claimed in claim 1, in which the substantially periodic cladding material has a triangular lattice structure.

4. A photonic crystal fibre, as claimed in claim 3, in which the triangular lattice comprises air holes in a solid matrix.

5. A photonic crystal fibre, as claimed in claim 4, in which the fraction of air in the cladding is at least 15% by volume based on the volume of the cladding.

6. A photonic crystal fibre, as claimed in claim 5, in which the region of lower refractive index comprises air.

7. A photonic crystal fibre, as claimed in claim 1, in which the regions of higher refractive index consist essentially of silica.

8. A photonic crystal fibre, as claimed in claim 1 in which the region of lower refractive index is a low pressure region.

9. A photonic crystal fibre, as claimed in claim 1, in which the lower index region comprises a material having a non-linear optical response, whereby light may be generated by non-linear processes in the lower-index region.

10. An optical device, including photonic crystal fibre according to claim 1.

11. An optical device, as claimed in claim 10, comprising a spectral filtering device.

12. An optical device, as claimed in claim 10, comprising an optical amplifier.

13. An optical device, as claimed in claim 10, comprising a laser.

14. An optical device, as claimed in claim 10, comprising a sensor that is capable of sensing a property of the gas of which the region of lower refractive index is comprised.

15. A telecommunications system, including an optical device according to claim 10.

16. A telecommunications system, including a photonic crystal fibre according to claim 1.

17. A telecommunications network including a telecommunications system according to claim 16.

18. A photonic crystal fibre comprising:
    a region of substantially uniform, lower refractive index;
    said lower refractive index region substantially surrounded by cladding which includes non-coaxial regions of higher refractive index made of canes and which is substantially periodic, wherein the region of lower refractive index is large enough to support at least one transverse mode and light is substantially confined in the lower refractive index region.

19. A photonic crystal fibre as claimed in claim 18, which is a single-mode fibre.

20. A method of making a photonic crystal fibre, comprising the following steps:
    (a) forming a stack of canes, the stack including at least one truncated cane which defines a cavity in the stack;
    (b) drawing the stack into a fibre having an elongate cavity.

21. A method, as claimed in claim 20, in which the cavity has a transverse dimension greater than the corresponding transverse dimension of any of the canes.

22. A method, as claimed in claim 21, in which the cavity has a transverse dimension greater than the sum of the corresponding dimensions of any two of the canes.

23. A method, as claimed in claim 20, in which the stack of canes comprises canes which are capillaries.

24. A method, as claimed in claim 23, in which the capillaries form a triangular array.

25. A method, as claimed in claim 23, in which the capillaries are filled with a material other than air.

26. A photonic crystal fibre made by a method as claimed in claim 20.

27. A method of transmitting light along a photonic crystal fibre, comprising the steps of:
    (a) providing a light source adjacent an end of said fiber; and
    (b) arranging for light from the light source to enter the fiber for transmission therethrough, the fiber being a fibre as claimed in claim 1.

28. A preform for a photonic crystal fibre, the preform comprising a stack of canes and a cavity in the stack, and said preform having a transverse cross-section through said cavity wherein said cavity has a transverse dimension greater than a corresponding dimension of any of the canes.

29. A preform as claimed in claim 28, wherein the cavity has a transverse dimension greater than the sum of the corresponding dimensions of any two of the canes.

30. A preform as claimed in claim 28, wherein the cavity has a cross-sectional area substantially equal to or greater than the cross-sectional area of a bundle of four canes.

31. A preform as claimed in claim 28, wherein the cavity has a cross sectional area substantially equal to or greater than the cross-sectional area of a bundle of seven canes.

32. A preform as claimed in claim 28, wherein the stack of canes includes at least one truncated cane which has an end portion at each end of the preform and includes an omitted section between each end portion so that the omitted portion defines the cavity in the stack of canes.

33. A preform as claimed in claim 28, wherein each of the canes is hollow.

34. A preform as claimed in claim 33, wherein the canes are silica and are fused together.

35. A preform as claimed in claim 28, wherein the cavity is in a central portion of the stack.

36. A photonic crystal fibre, comprising a stack of canes and a cavity in the stack, said fibre having a transverse cross-section through said cavity wherein said cavity has a transverse dimension greater than a corresponding dimension of any of the canes.

37. A fibre as claimed in claim 36, wherein the cavity has a transverse dimension greater than the sum of the corresponding dimensions of any two of the canes.

38. A fibre as claimed in claim 36, wherein the cavity has a cross-sectional area substantially equal to or greater than the cross-sectional area of a bundle of four canes.

39. A fibre as claimed in claim 36, wherein the cavity has a cross sectional area substantially equal to or greater than the cross-sectional area of a bundle of seven canes.

40. A fibre as claimed in claim 36, wherein the stack of canes includes at least one truncated cane which has an end portion at each end of the fibre and includes an omitted section between each end portion so that the omitted portion defines the cavity in the stack of canes.

41. A fibre as claimed in claim 36, wherein each of the canes is hollow.

42. A fibre as claimed in claim 41, wherein the canes are silica and are fused together.

43. A fibre as claimed in claim 36, wherein the cavity is in a central portion of the stack.

* * * * *